(12) United States Patent
Amrit et al.

(10) Patent No.: US 11,175,639 B2
(45) Date of Patent: Nov. 16, 2021

(54) SYSTEM AND METHOD FOR SUPERIOR PERFORMANCE WITH RESPECT TO BEST PERFORMANCE VALUES IN MODEL PREDICTIVE CONTROL APPLICATIONS

(71) Applicant: SHELL OIL COMPANY, Houston, TX (US)

(72) Inventors: Rishi Amrit, Katy, TX (US); Pierre Christian Marie Carrette, Seria (BN); John Martin Williamson, Houston, TX (US); William Matthew Canney, Fulshear, TX (US)

(73) Assignee: SHELL OIL COMPANY, Houston, TX (US)

( * ) Notice: Subject to any disclaimer, the term of this patent is extended or adjusted under 35 U.S.C. 154(b) by 0 days.

(21) Appl. No.: 15/578,075

(22) PCT Filed: Jun. 2, 2016

(86) PCT No.: PCT/US2016/035454
§ 371 (c)(1),
(2) Date: Nov. 29, 2017

(87) PCT Pub. No.: WO2016/196752
PCT Pub. Date: Dec. 8, 2016

(65) Prior Publication Data
US 2018/0150037 A1 May 31, 2018

Related U.S. Application Data

(60) Provisional application No. 62/171,598, filed on Jun. 5, 2015.

(51) Int. Cl.
G05B 13/04 (2006.01)

(52) U.S. Cl.
CPC ......... *G05B 13/042* (2013.01); *G05B 13/041* (2013.01); *G05B 13/048* (2013.01)

(58) Field of Classification Search
None
See application file for complete search history.

(56) References Cited

U.S. PATENT DOCUMENTS

| | | |
|---|---|---|
| 5,457,625 A | 10/1995 | Lim et al. |
| 2004/0049295 A1 | 3/2004 | Wojsznis et al. |

(Continued)

FOREIGN PATENT DOCUMENTS

| | | |
|---|---|---|
| CN | 1231436 A | 10/1999 |
| CN | 1762525 A | 4/2006 |

(Continued)

OTHER PUBLICATIONS

International Search Report and Written Opinion received for PCT Patent Application No. PCT/US2016/035454, dated Sep. 2, 2016, 5 pages.

(Continued)

*Primary Examiner* — Mohammad Ali
*Assistant Examiner* — Saad M Kabir
(74) *Attorney, Agent, or Firm* — Shell Oil Company (57) ABSTRACT

Model predictive control is used to obtain the best performance value for an objective in a dynamic environment. One or more best performance values for a model predictive application are obtained by utilizing asymmetric dynamic behavior that pushes the process to the edges of the operative window. When a setpoint becomes infeasible, a controller slows down when moving away from a specified setpoint. When the infeasibility clears and the controller starts moving back towards the setpoint, the controller follows a tuned speed. When the controller moves in a direction against economic profit, the controller slows down and when mov- (Continued)

ing in the direction of economic profit, the controller follows the tuned dynamic speed. The controller computes the best performance value for each controlled variable and is equal to the setpoint for the controlled variables with a setpoint or the highest profit value between limits for controlled values affected by economic functions.

15 Claims, 4 Drawing Sheets

(56) References Cited

U.S. PATENT DOCUMENTS

| | | |
|---|---|---|
| 2005/0075738 A1 | 4/2005 | Attarwala |
| 2005/0154477 A1 | 7/2005 | Martin et al. |
| 2011/0172976 A1 | 7/2011 | Budiman et al. |

FOREIGN PATENT DOCUMENTS

| | | |
|---|---|---|
| CN | 101322083 A | 12/2008 |
| CN | 101563660 A | 10/2009 |
| CN | 101887262 A | 11/2010 |
| JP | 2008512748 A | 4/2008 |
| JP | 2013513166 A | 4/2013 |

OTHER PUBLICATIONS

Rawlings et al., "Unreachable Setpoints in Model Predictive Control", IEEE Transactions on Automatic Control, vol. 53, No. 9, 2008, pp. 2209-2215.

Rawlings et al., "Optimizing Process Economic Performance Using Model Predictive Control", Nonlinear Model Predictive Control, 2009, pp. 119-138.

Rawlings et al., "Fundamentals of Economic Model Predictive Control", 2012 IEEE 51st Conference on Decision and Control(CDC), Aug. 29, 2013, pp. 3851-3861, XP055531044.

Qin et al.,"A Survey of Industrial Model Predictive Control Technology", Control Engineering Practice, vol. 11, 2003, pp. 733-764.

SYSTEM AND METHOD FOR SUPERIOR PERFORMANCE WITH RESPECT TO BEST PERFORMANCE VALUES IN MODEL PREDICTIVE CONTROL APPLICATIONS

PRIORITY CLAIM

The present application is the National Stage (§ 371) of International Application No. PCT/US2016/035454, filed Jun. 2, 2016, which claims priority from U.S. Patent Application No. 62/171,598, filed Jun. 5, 2015 incorporated herein by reference.

TECHNICAL FIELD

The present disclosure relates generally to high performance operating points, termed as best performance values, in a control application and providing achievement of superior dynamic performance with respect to these best performance values in model predictive controllers.

BACKGROUND

In a typical multivariable control strategy, manipulated variable (MV) values are computed such that certain specified control objectives are satisfied. These control objectives are most commonly expressed as fixed desired values (or setpoints) and/or optimization cost functions based on process economics, and are ranked amongst each other in a desired priority order. The control strategies are designed to first use the steady state model to compute static optimum operating points around which a dynamic tracking control strategy is designed. Due to infeasibility, these steady-state target values of controlled variables (CV) may differ from the user-specified values (for example, the setpoints or real-time optimization (RTO) targets) or may have a higher economic cost than other possible values within the specified CV limits. This creates the possibility of high potential values within the CV and MV limits, which are statically-infeasible. The translation of setpoints and/or economic objective functions to static targets for tracking make the control strategies loose transient benefits as the control move plan is based on chasing static targets instead of meeting the original control objectives. Some prior designs address this problem by using the original setpoints specified or the economic function, in the dynamic tracking control design, yielding an asymmetric dynamic response of the CV around the optimal steady state.

Such prior systems are discussed in the articles "Unreachable Setpoints in Model Predictive Control," *IEEE Transactions on Automatic Control*, vol. 53, no. 9, pp. 2209-2215, 2008 by James B. Rawlings, Dennis Bonnè, John B. Jørgensen, Aswin N. Venkat, and Sten Bay Jørgensen and "Optimizing Process Economic Performance Using Model Predictive Control," *Nonlinear Model Predictive Control*, pp. 119-138, 2009 by J. Rawlings and R. Amrit.

The steady-state targets are the values where the CVs remain static unless perturbed. However, under real world conditions these steady-state targets do not remain static and thus the CVs are in transient most of the time due to, for example, noise and un-modeled disturbances. If there are any high potential areas available, this opens up a possibility to extract higher cumulative benefits in terms of either vicinity from the user specified setpoints or economic benefit.

Almost all control applications are multiobjective in nature with the control objectives containing a mix of setpoints, CV limits and economic functions ranked in a specified priority order and dynamically tuned for a specified dynamic speed of response. The previous model predictive controller designs for asymmetric response do not account for multiple control objectives and differences between the dynamic speed of response and the relative steady state importance of the CV's. The present invention aims to provide higher controller performance taking into account all the objectives and their relative and/or absolute prioritization.

SUMMARY

In accordance with the present disclosure, a system and method is herein disclosed for pushing to the edges of the operating window by producing asymmetric dynamic behavior. When a setpoint becomes infeasible, the controller slows down when moving away from the setpoint. When the infeasibility clears and the controller starts moving back towards the setpoint, the controller will follow the tuned dynamic speed. When the controller is moving in a direction against economic profit, the controller slows down and when moving in the direction of economic profit, the controller follows the tuned dynamic speed. The best performance value (BPV) is defined and computed by the controller for each controlled variable (CV) and is equal to the setpoint for CVs with a setpoint or the highest profit value between limits for controlled values affected by economic functions.

In one embodiment, a setpoint is specified for a controlled variable for a model. Steady state target values and best performance values are determined. A disturbance is estimated in the system. In one or more embodiments, the estimated disturbance is one or more of plant model mismatch, model uncertainty, unmodeled perturbations, unanticipated perturbations, sensor noise, measurement noise, change in temperature, change in quality measurements, change in a control, change in a level of inventory, and change in a volume of inventory. One or more dynamic tuning weights are also determined. The one or more best performance values are adjusted to make them consistent with the dynamic tuning weights and steady state targets where the steady state targets may be based, at least in part, on a specified static model. A dynamic control objective is created and the control problem is solved.

In one embodiment, the setpoint of the controlled variable comprises an upper setpoint and a lower setpoint or limits. These limits may be specified by a user. In other embodiments, a plurality of control variables exist with each control variable have an associated setpoint.

The method disclosed herein is technically advantageous because a method is provided for producing asymmetric dynamic behavior. That is, whenever a setpoint becomes infeasible, the controller slows down when moving away from the setpoint. When the infeasibility clears and the controller starts moving back towards the setpoint, the controller will follow the tuned speed. When the controller is moving in a direction against economic profit, the controller slows down and when moving in the direction of economic profit, the controller follows the tuned dynamic speed. The best performance value (BPV) is computed by the controller for each CV and is equal to the setpoint for CVs with a setpoint or the highest profit value between limits for CVs affected by economic functions providing improved overall control performances.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

While the present disclosure is susceptible to various modifications and alternative forms, specific example embodiments thereof have been shown in the drawings and are herein described in detail. It should be understood, however, that the description herein of specific example embodiments is not intended to limit the disclosure to the particular forms disclosed herein, but on the contrary, this disclosure is to cover all modifications and equivalents as defined by the appended claims.

DETAILED DESCRIPTION

A controller may be used to control processes in any number of environments, for example, in a petrochemical environment. In such control processes certain upper and lower constraints may be imposed on the environment to maintain operations within a set of specified parameters. For example, temperature, pressure, and volume level constraints may be imposed on systems in the environment to attempt to maintain steady-state operation. For example, in certain environments it may be required to maintain operation within certain constraints due to safety, economic, process control or any other concerns known to one of ordinary skill in the art.

Referring now to the drawings, the details of specific example embodiments are schematically illustrated. Like elements in the drawings will be represented by like numbers, and similar elements will be represented by like numbers with a different lower case letter suffix.

Figure 1:
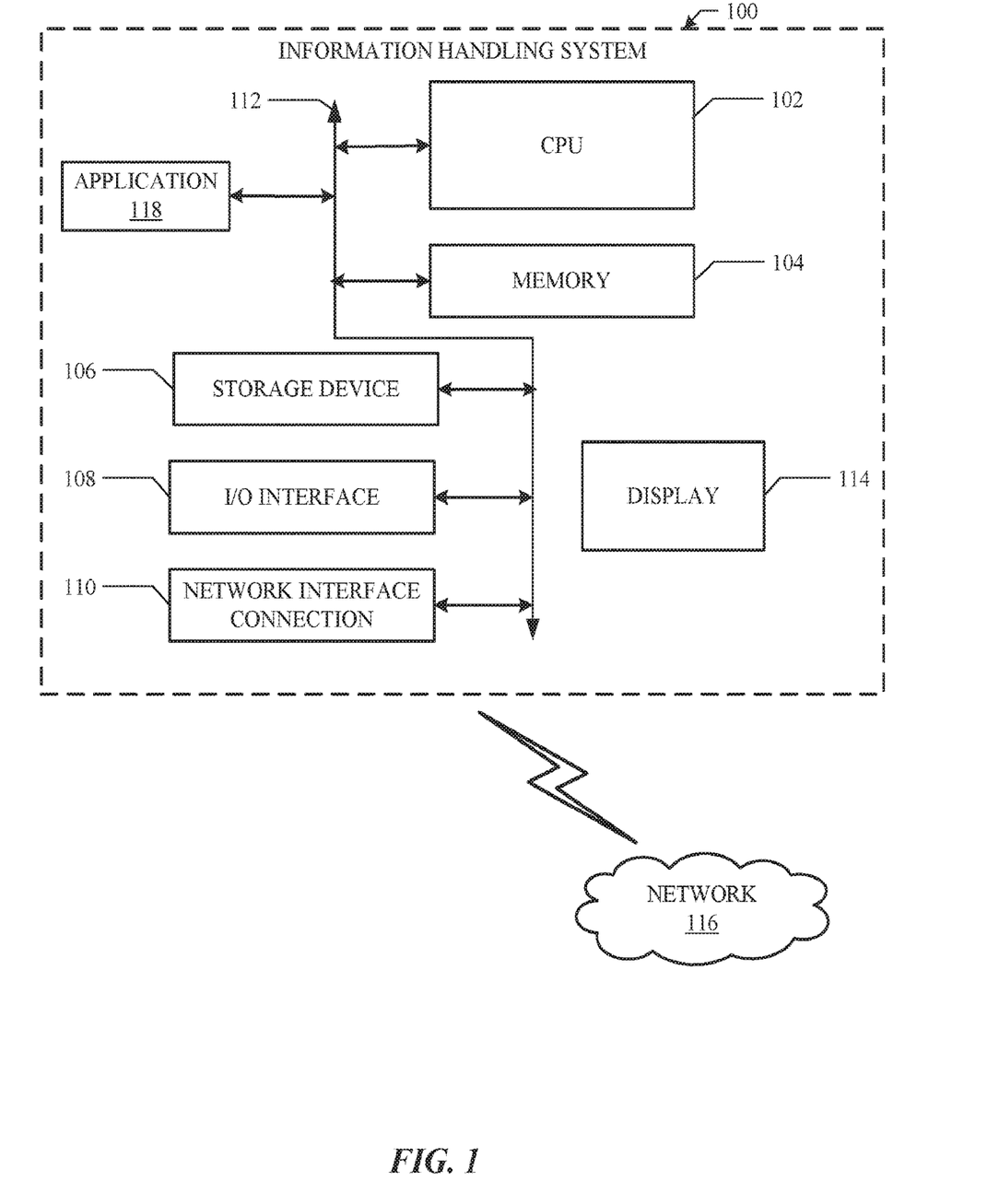
FIG. 1 shows an example information handling system according to one or more embodiments of the present disclosure.

For one or more embodiments of the present invention, an information handling system may be utilized to implement one or more embodiments. Such embodiments may be implemented on virtually any type of information handling system regardless of the platform being used. Such information handling system hardware used to implement one or more of the embodiments described herein may include a processor configured to execute one or more sequences of instructions, programming stances, or code stored on a non-transitory, computer-readable medium. For example, as shown in FIG. 1, an information handling system 100 includes one or more central processing units (CPU) 102, associated memory 104 (for example, random access memory (RAM), read-only memory (ROM), cache memory, flash memory, etc.), a storage device 106 (for example, a hard disk, solid state memory, an optical drive such as a compact disk drive or digital video disk (DVD) drive, a flash memory stick, etc.), and numerous other elements and functionalities typical of today's computers (not shown). The CPU 102 may function to execute program instructions from one or more modules where the program instructions are stored in a memory device such as memory 104 or storage device 106 or any other memory known to one of ordinary skill in the art. The CPU 102 may be configured to execute an application 118 as contemplated by one or more embodiments of the present invention. The CPU 102 may be a general purpose microprocessor, a microcontroller, a digital signal processor, an application specific integrated circuit (ASIC), a field programmable gate array (FPGA), a programmable logic device, a controller, a state machine, a gated logic, discrete hardware components, an artificial neural network, or any like suitable hardware known to one of ordinary skill in the art that can perform calculations of other manipulations of data according to the present invention. The information handling system 100 may also include an I/O interface 108 for sending and/or receiving inputs, such as inputs from a keyboard, a mouse, or a microphone. I/O interface 108 may also receive information such as multi-dimensional (for example, 3D) geophysical data, one or more values associated with one or more readings, settings, results, variables, feedback (or any other type of data known to one of ordinary skill in the art) from any one or more processes, systems, or external components including such information related to the liquefication of natural gas, or any other information known to one of ordinary skill in the art used in systems for model predictive control. For example, in certain embodiments, I/O interface 108 may receive a quality control, level, pressure, temperature or any other reading known to one of ordinary skill in the art from a component within the environment. Further, the information handling system 100 may include output means, such as a display 114 (for example, a liquid crystal display (LCD), a plasma display, or cathode ray tube (CRT) monitor). Display 114 comprises the necessary elements to display any type of data necessary for any of the one or more embodiments of the present invention.

The information handling system 100 may be connected to a network 116 (for example, a local area network (LAN), a wide area network (WAN) such as the Internet, or any other similar type of network) via a network interface connection 110 to receive data from sensors, measurements, readings or any other data known to one of ordinary skill in the art as required by any one or more embodiments of the present invention. Those skilled in the art will appreciate that many different types of information handling systems exist, and the aforementioned input and output means may take other forms. Generally speaking, the information handling system 100 includes at least the minimal processing, input, and/or output devices, whether hardware, software or any combination thereof, necessary to practice embodiments of the invention.

The CPU 102 of information handling system 100 may also execute applications 118. Application 118 may include one or more processors (not shown) where processor refers to a multivariable model-based predictive estimator or controller (MPC) designed to perform advanced process control (APC). A CPU 102 may execute instructions for many functions, including I/O communications, variable and measurement validation, estimation and prediction, steady-state optimization, and control move calculation associated with application 118. Application 118 may contain its own estimation function, but has parameters available for interface and collaboration with other processing units including CPU 102.

In the specification and in the claims the term 'manipulated variable' (MV) is used to refer to variables that can be manipulated by the application 118, and the term 'controlled variable' (CV) is used to refer to a variable that has to be kept by the advanced process controller at a predetermined value (set point) or within a predetermined range (set range). The term 'disturbance variable' (DV) is used to refer to a variable whose value can change independently of the controller but whose effect is included in the controller model. The term 'intermediate variable' (IV) is used to refer to a variable that is an output of the controller model but which has relationships as an input to other model outputs. The expression "variable sets" is used to refer to a defined group of variables used by a given application 118 of an application. A given application 118 may have many variable sets and any variable may be a member of a variable set. However, a variable only appears once in a variable set. The expression 'optimizing a variable' is used to refer to maximizing or minimizing the variable or a function of variables, and to maintaining the variable at a predetermined value. The term 'best performance" is used to refer to the most vicinity to a user provided value (setpoint/RTO target) or an economically highest profit/lowest cost, whichever is higher priority for given circumstances. The term process output variable (POV) relates to a variable whose value is changed by changes in the process inputs. The term best performance value (BPV) is used to refer to the value that would correspond to the best performance within specified CV limits, where the CV limits are the original limits before feasibility recover because relaxation in limits is considered a drop in performance. The BPV values are a byproduct of the static calculation. The expression 'real-time optimization' is used to refer to an automated process for computing the best economic operating point of a process with given constraints.

Variables in application 118 can be further classified based on their structural relationship to the process. Process inputs can be classified as MVs (independent process settings which will be adjusted by the controller) or as DVs (independent process settings which will not be adjusted by the controller of the application of, and process measurements which are not affected by changes in the MVs). POVs may include as attributes any one or more of CVs, MVs, or IVs or any other attributes known to one of ordinary skill in the art.

Application MVs may be grouped into sub-systems to optimize their processing. The application may contain a coordination layer that manages each individual sub-system and ensures proper collaboration between the sub-systems. Application 118 calculations may include static optimization and dynamic move calculations. Static optimization, in which steady state target values for each CV may be estimated based on current measurements, predicted response, prioritized constraints, and specified (static optimization) economic functions. Dynamic move calculation, in which a current move and a projected move plan for each controller MV is determined based on response tuning and the calculated target values.

Variable Sets provide for grouping CVs for display and for transactional control (for example, changing modes). Economic functions are used to define specific steady-state (or static) optimization objectives for the controller, and determine target values for each CV, consistent with both the full set of CVs and the controller model. An application's mode is the manner in which a controller of the application is running which includes inactive, standby (staged), and active (live). Special permission settings may be instituted for an operator or use to restrict the access to changing an application's mode.

The operator or user should set the requested mode to active for the application 118 to perform estimation or control. The operator or user may place the application 118 in standby when preparing for active mode, or when a short term intervention in the application's actions is required. The operating sets will remain in their current requested mode when the application 118 is placed in standby. The operator with special permissions may place the controller 118 in inactive mode if it is desired to inactivate the controller for a longer period; this will automatically return the application's operating sets and economic functions to inactive.

A user may be any operator, engineer, one or more information handling systems 100 or any other user known to one of ordinary skill in the art.

Further, those skilled in the art will appreciate that one or more elements of the aforementioned information handling system 100 may be located at a remote location and connected to one or more other elements over a network. Further, embodiments of the invention may be implemented on a distributed system having a plurality of nodes, where each portion of the invention may be located on a different node within the distributed system. For example, the display 114 may be located remotely from the other components of the information handling system 100. Information handling system 100 may comprise one or more client devices, servers, or any combination thereof.

Figure 2:
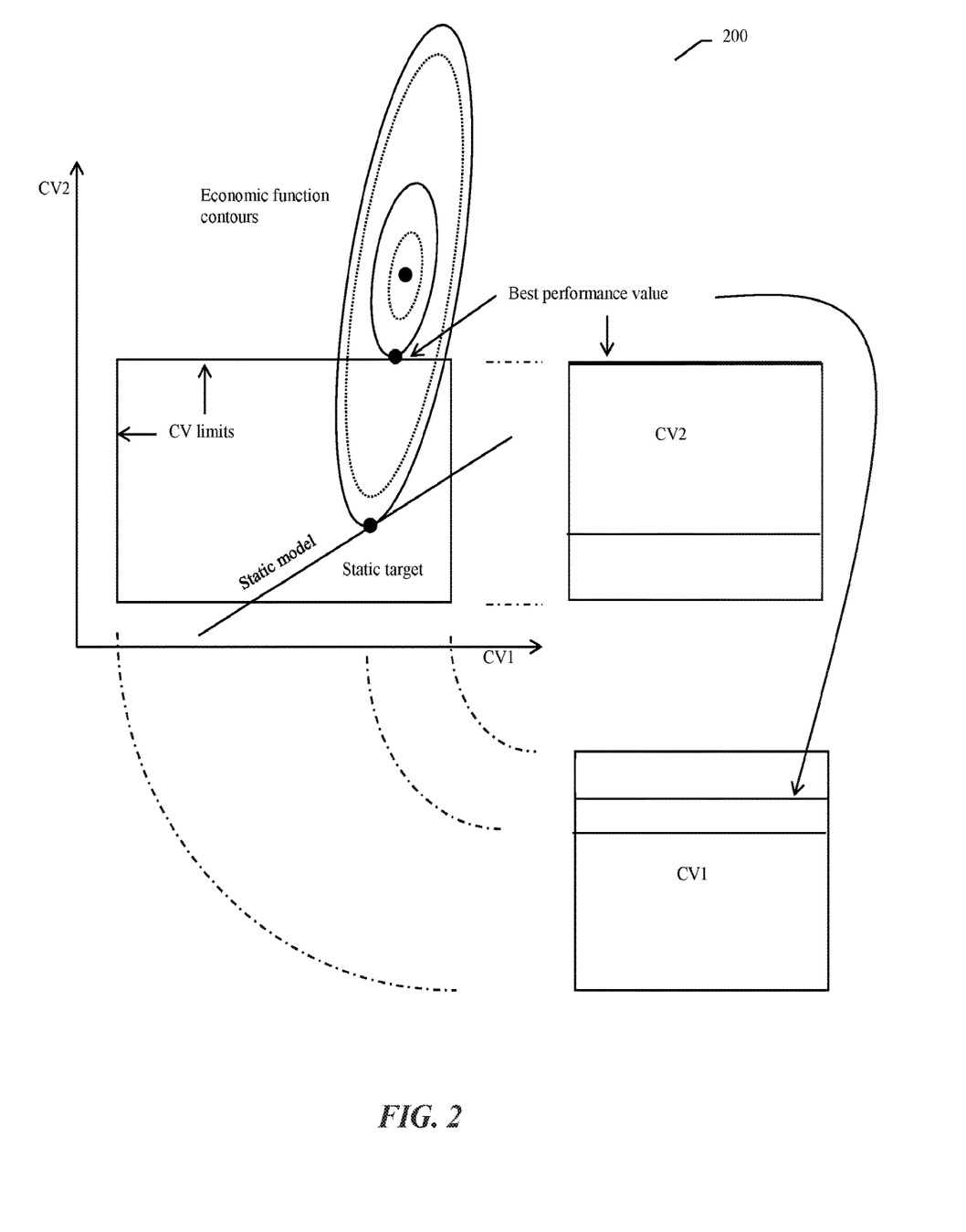
FIG. 2 illustrates a best performance value according to one or more embodiments of the present disclosure.

Referring to FIG. 2, a best performance value according to one or more embodiments of the present disclosure is shown generally at 200. Illustrated in FIG. 2 is a two CV case, where the axis labeled CV1 represents the values for CV1 and the axis labeled CV2 represents the values for CV2. As shown by the boxes labeled CV1 and CV2 the upper and lower limits of CV1 and CV2 form a rectangle. The static model function is represented by the solid line labeled static model. The economic function cost contours are represented by the oval rings with the global optimum outside the CV limits. The static target for the static model is the point where the economic function contours are tangent to the steady state line, and is represented by the solid circle labeled static target. The BPV is the best feasible economic cost point indicated by the solid circle labeled Best performance value. The economic cost oval contours are lines representing equal cost value, for example, any point on the given contour has the same economic cost. As the objective is to try to minimize the cost, the method looks for a point in the CV1-CV2 space where the economic cost is the least (profit is highest). This is found by identifying a point where the economic contours are tangent to the CV constraint box (red point in FIG. 2). This red point is a (CV1, CV2) value and hence the value of CV1 at this point is CV1's best performance value. In the example shown at 200, the system has experienced a disturbance which pushes a constraint outside the CV limits as indicated by the solid circle labeled Disturbance Constraint. BPV values may be computed as a byproduct of the static calculation.

Figure 3:
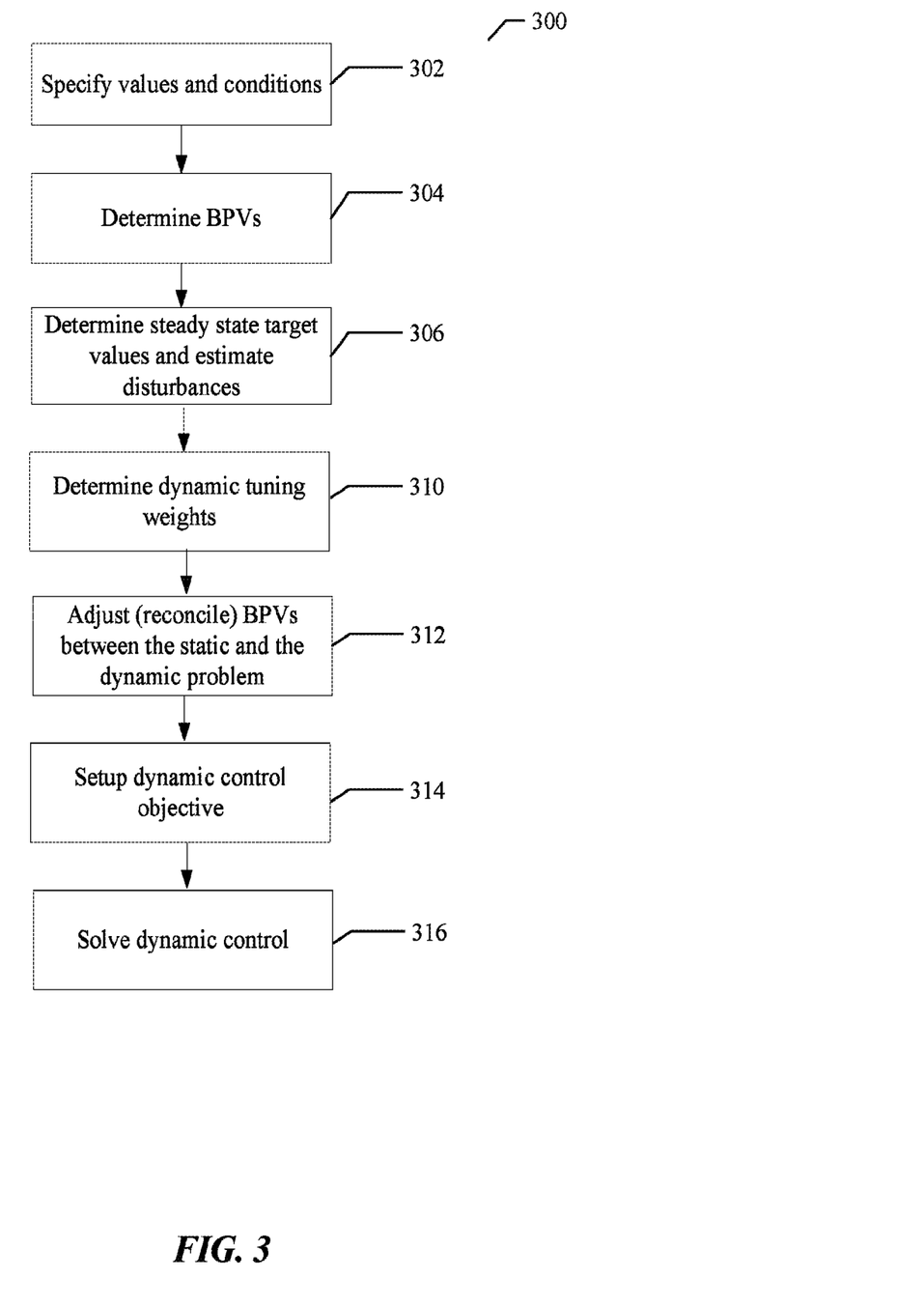
FIG. 3 shows a flow diagram for constructing dynamic control objective using BPVs.

Referring to FIG. 3, depicted generally at 300 is a flow diagram for calculating BPV's and constructing dynamic control objective using BPVs. At step 302 the control objectives which may include setpoint values, limits, economic functions and the relative prioritization of these objectives is specified for a CV. In one or more embodiments, one or more CVs may be utilized. For example, as shown in FIG. 2, two CVs may be utilized with each CV having two setpoints. At step 304 and 306, BPVs and static targets for all the CVs are determined taking into account the specified control objectives and their specified prioritization along with disturbance estimates coming from estimation calculations. A disturbance may be a change in temperature, quality control, level, volume or any other disturbance known to one of ordinary skill in the art. A disturbance may also show up due to process model mismatch. One or more disturbances may occur for a given environment.

Next, at step 310, dynamic tuning weights are determined based, at least in part, on one or more user specifications related to the user's required dynamic speed of response. Because of the detected disturbance, at step 312, a potential adjustment in BPVs is determined to make the dynamic optimization problem consistent with static targets so that the dynamic control solution converges to the desired steady state in the long run. The inconsistency is usually caused by relative prioritization of control objectives in the static control problem representing a static control objective which is different than the dynamic objective specified in terms of the relative speeds of response of all the CVs. The potential adjustment (reconciliation) in BPVs is computed by appealing to the fact that the solution to the following problem must be equal to the computed static solution:

$$\min_{y,x,u} \frac{1}{2}(y - (y_{BPV} + \epsilon))' Q_t (y - (y_{BPV} + \epsilon))$$

$$L_{Se}z = R_{Se}, L_{Si}z \leq R_{Si}$$

Where $y_{BPV}$ denotes the BPV's of all the CV's, $\epsilon$ denotes any potential adjustments to the BPV's, $L_{Se}z=R_{Se}, L_{Si}z \leq R_{Si}$ are the set of equality and inequality constraints representing MV and CV limits and $Q_t$ is a diagonal matrix where the diagonal elements are the dynamic tuning weights determined from the user specification of the desired dynamic speeds of response for all the CV's. Note that z denotes the stacked vector of CVs, MVs and states. If the solution to the above problem is equal to the static solution computed, then the dynamic control problem formulated around the potentially adjusted BPV's: ($y_{BPV}+\epsilon$), will always converge to the static solution in the long run and hence the dynamic plan of action computed by the controller would be consistent with the static targets.

The problem of finding the adjustment to BVPs is stated as:

$$\min \epsilon' Q_t \epsilon$$
s.t. arg $$\{\min(y - (y_{BPV} + \epsilon))' Q_t (y - (y_{BPV} + \epsilon)) \mid L_{Se}z = R_{Se}, L_{Si}z \leq R_{Si}\} = y_t$$

This problem converts to a simple quadratic programming problem (QP) via substitution of the inner problem by its optimality conditions.

Since $Q_t \geq 0$, the inner problem is a convex quadratic problem and hence the first order optimality conditions are necessary and sufficient. In one embodiment, two kinds of optimality conditions may be used. The two optimality conditions are two ways to solve this problem. Using normal cone conditions turns out to be more cumbersome than using Karush-Kuhn-Tucker (KKT) conditions. Thus, the present disclosure is confined to KKT conditions.

The Langrangian of the inner problem is:

$$\mathcal{L} = \frac{1}{2}(y-(y_{BPV}+\epsilon))'Q_t(y-(y_{BPV}+\epsilon)) + \lambda_e'(L_{Se}z-R_{Se}) + \lambda_i'(L_{Si}z-R_{Si})$$

The corresponding KKT conditions are:

$$\begin{bmatrix} Q_t(y_t - (y_{BPV} + \epsilon)) \\ 0 \end{bmatrix} + L_{se}'\lambda_e + L_{Si}'\lambda_i = 0$$

$$\lambda_i \geq 0$$

$$\lambda_i'(L_{Si}z - R_{Si}) = 0$$

Hence the outer optimization becomes:

$$\min_{\epsilon,\lambda_e,\lambda_i} \frac{1}{2}\epsilon' Q_t \epsilon \qquad (1)$$

$$\begin{bmatrix} -Q_t & L_{se}' & L_{si}' \\ 0 & & \end{bmatrix} \begin{bmatrix} \epsilon \\ \lambda_e \\ \lambda_i \end{bmatrix} = \begin{bmatrix} Q_t(y_{BPV} - y_t) \\ 0 \end{bmatrix}$$

$$\lambda_i \geq 0$$

$$\lambda_i'(L_{Si}z_t - R_{Si}) = 0$$

The solution of this problem is the minimum adjustment in BPVs needed to make the dynamic control objective consistent with the steady state targets. Denoting the solution of this problem as $\bar{y}_{BPV}$, the dynamic control objective may be formulated with respect to $\bar{y}_{BPV}$, for example by penalizing error from the potentially adjusted BPV.

At step 314, the adjusted BPVs are utilized to create the dynamic control objective consistent with the steady state targets. At step 316, the dynamic control optimization is solved, with the cost measuring the error away from the potentially adjusted BPV's, to compute the MV plan of action.

Figure 4:
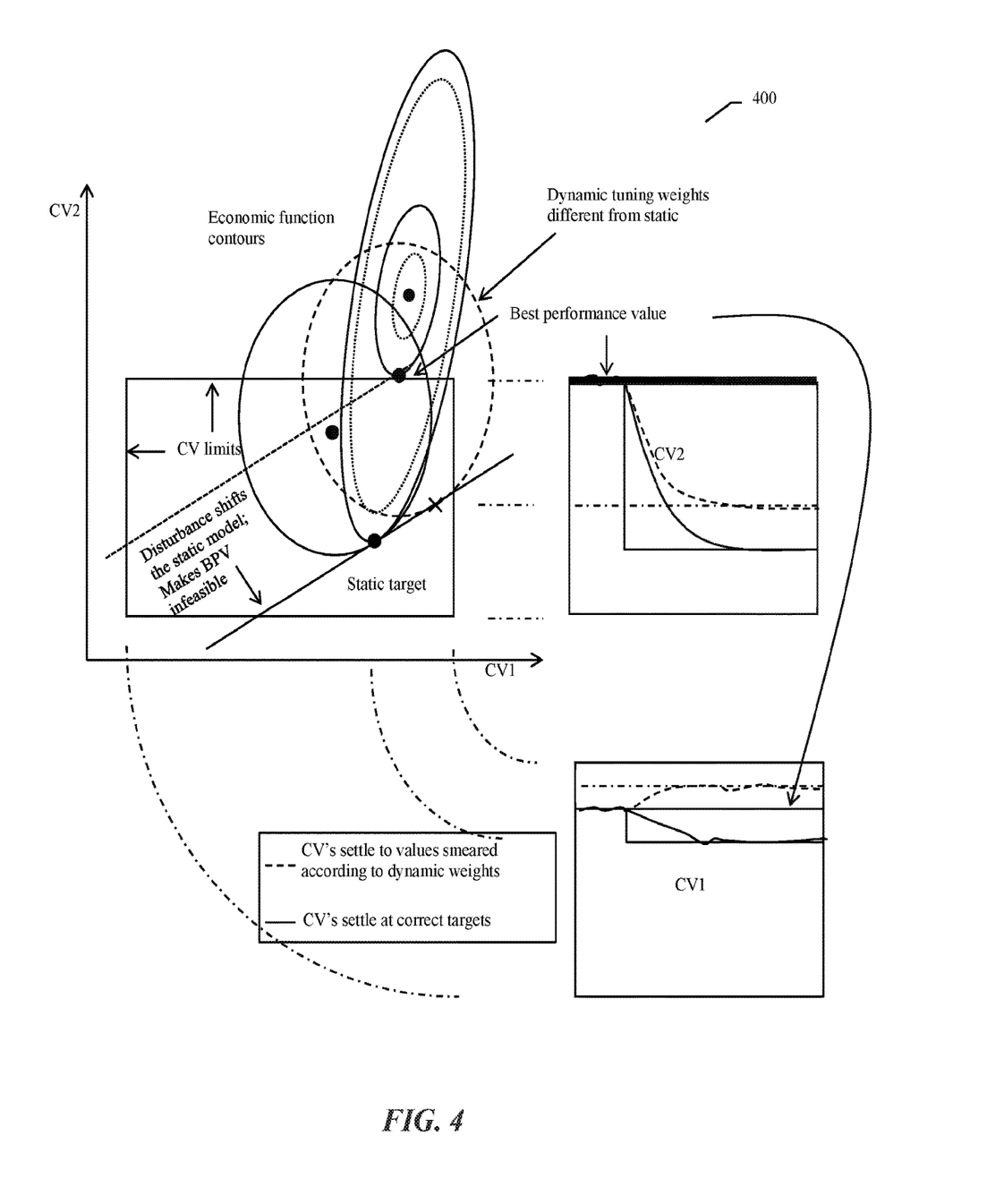
FIG. 4 illustrates an adjusted BPV according to one or more embodiments of the present disclosure.

The adjusted values of the BPVs in general do not have any engineering significance. Rather, the adjusted values of the BPVs ensure that appropriate penalty is applied on the CV error with respect to the original BPVs so that the CVs settle at the desired target in the long run as illustrated in FIG. 4. In FIG. 4, the dashed contours represent the cost contours corresponding to the dynamic tuning weights. Since the dynamic tuning weights are different than the static weights and economic function, the dynamic control problem centered around the BPV's will drive the controller to the static values denoted by the cross illustrated in FIG. 4 (for example, a steady state operating point where the dynamic control stage cost is minimal). Since the dynamic weights do not represent the steady state control objectives in general (for example, prioritization), this steady state value optimal with respect to the dynamic stage cost is different than the static solution computed by the static control problem. Hence, the minimum required adjustment is made to the BPV's so that when the BPV's are shifted, the dynamic stage cost contours become tangent to the steady state model line at the same point as the desired static solution, making the static and the dynamic solutions consistent.

FIG. 4 also illustrates a disturbance scenario where in the absence of disturbance the BPVs lie on the stead state line (green dashed line) and hence BPVs are feasible (and hence no adjustment in BPVs is needed). When a disturbance hits the system, it displaces the static model lines as shown in FIG. 4 to a new position where the BPV does not lie on the static model anymore, and due to the difference in the static and dynamic control objective specification an adjustment is needed in the BPVs as explained earlier. Hence, given the dynamic tuning weights, the values of steady state targets and BPVs, the adjustment in BVPs need to be found that make the BVPs consistent with the targets. Using the functions above the adjusted BPV values are determined which ensures that the appropriate penalty is applied on the CV error with respect to the original BPVs so that the CVs settle at the desired target in the long run.

While the embodiments are described with references to various implementations and exploitations, it will be understood that these embodiments are illustrative and that the scope of the inventive subject matter is not limited to them. Many variations, modifications, additions, and improvements are possible.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fail within the scope of the inventive subject matter.

That which is claimed is:

1. A method for high dynamic performance control of control variables in a model predictive controller, comprising the steps of:
    specifying a setpoint for a controlled variable;
    specifying economic functions driving a controller variable;
    specifying relative prioritization between control objectives;
    determining a steady state target value;
    determining one or more best performance values;
    determining a stage cost;
    detecting a disturbance;
    determining one or more dynamic tuning weights;
    adjusting the one or more best performance values;
    creating dynamic control objective using the adjusted one or more best performance values;
    computing dynamic plan of actions for manipulated variables; and
    executing the dynamic plan of actions for manipulated variables with respect to an environment wherein the dynamic plan of actions exhibits asymmetric behavior such that whenever a setpoint becomes infeasible, the controller slows down when moving away from the setpoint and when the setpoint becomes feasible the controller follows the tuned speed when moving towards the setpoint.

2. The method of claim 1, wherein the setpoint of the controlled variable comprises an upper setpoint and a lower setpoint.

3. The method of claim 1, further comprising:
    specifying a second setpoint for a second controlled variable, specifying at least one of economic objectives, and relative prioritization of control objectives and economic function.

4. The method of claim 1, wherein the adjusted best performance values are based, at least in part, on the detected disturbance.

5. The method of claim 1, wherein the detected disturbance comprises one or more of change in temperature, quality, control, level, and volume.

6. The method of claim 1, wherein the steady state target value is based, at least in part, on a specified static model.

7. The method of claim 1, wherein the stage cost is based, at least in part, on one or more assessed penalties.

8. A system for control of controlled variables in a model predictive controller, the system comprising:
    one or more processors for processing information;
    a memory communicatively coupled to the one or more processors; and
    one or more controllers that comprise instructions stored in the memory, the instructions, when executed by the processor, operable to perform operations comprising:
    specifying a setpoint for a controlled variable;
    determining a steady state target value;
    determining one or more best performance values;
    determining a stage cost;
    detecting a disturbance;
    determining one or more dynamic tuning weights;
    adjusting the one or more best performance values;
    creating dynamic control objective using the adjusted one or more best performance values;
    adjusting a control model; and
    executing the adjusted control model with respect to an environment wherein the dynamic plan of actions exhibits asymmetric behavior such that whenever a setpoint becomes infeasible, the controller slows down when moving away from the setpoint and when the setpoint becomes feasible the controller follows the tuned speed when moving towards the setpoint.

9. The system of claim 8, wherein the setpoint of the controlled variable comprises an upper setpoint and a lower setpoint.

10. The system of claim 8, further comprising:
    specifying a second setpoint for a second controlled variable.

11. The system of claim 8, wherein the adjusted best performance values are based, at least in part, on the detected disturbance.

12. The system of claim 8, wherein the detected disturbance comprises one or more of change in temperature, quality, control, level, and volume.

13. The system of claim 8, wherein the steady state target value is based, at least in part, on a specified static model.

14. The system of claim 8, wherein the stage cost is based, at least in part, on one or more assessed penalties.

15. A method for high dynamic performance control of control variables in a model predictive controller, comprising the steps of:
    specifying a setpoint for a controlled variable;
    specifying economic functions driving a controller variable;
    specifying relative prioritization between control objectives;
    determining a steady state target value;
    determining one or more best performance values wherein the best performance value is the value that corresponds to the best performance within specified limits and is equal to the setpoint for controlled variables or the highest profit value between limits for controlled variables affected by economic functions;
    determining a stage cost;
    detecting a disturbance;
    determining one or more dynamic tuning weights;
    adjusting the one or more best performance values;
    creating dynamic control objective using the adjusted one or more best performance values;
    computing dynamic plan of actions for manipulated variables; and executing the dynamic plan of actions for manipulated variables with respect to an environment wherein the dynamic plan of actions exhibits asymmetric behavior such that whenever a setpoint becomes infeasible, the controller slows down when moving away from the setpoint and when the setpoint becomes feasible the controller follows the tuned speed when moving towards the setpoint.

* * * * *